Jan. 27, 1970
W. K. GRASSAUER
3,491,426
WIRE HOLDING FIXTURE
Filed April 5, 1968
2 Sheets-Sheet 1
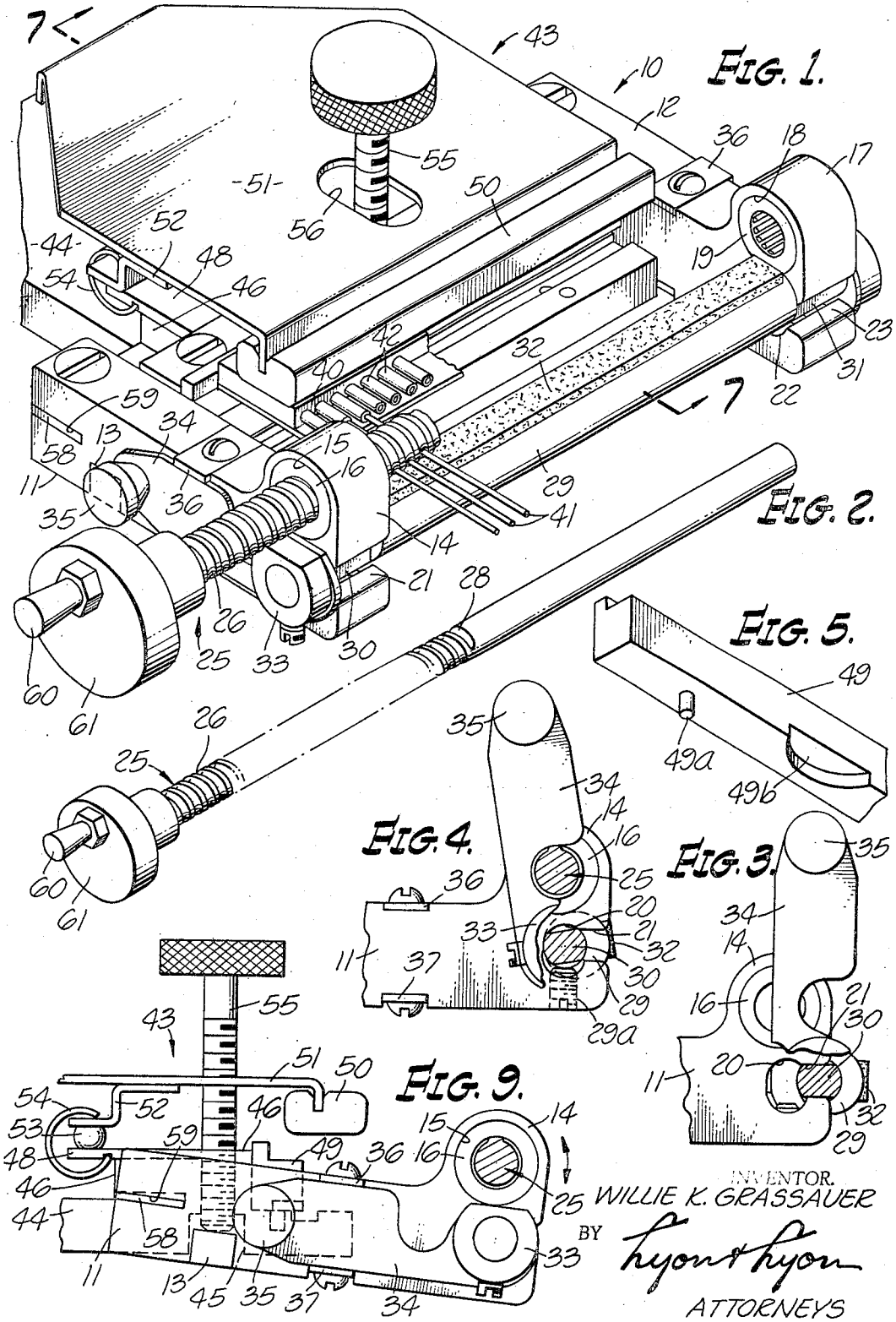
INVENTOR.
WILLIE K. GRASSAUER
BY
Lyon & Lyon
ATTORNEYS

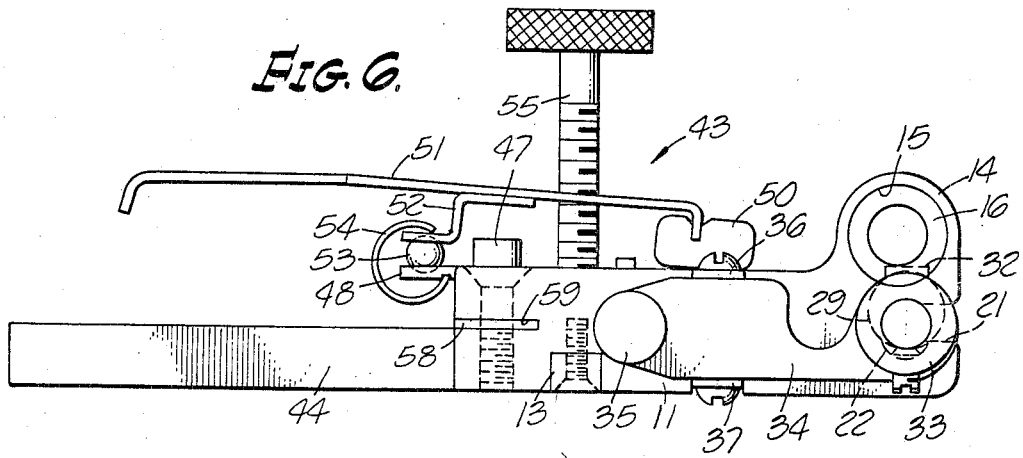
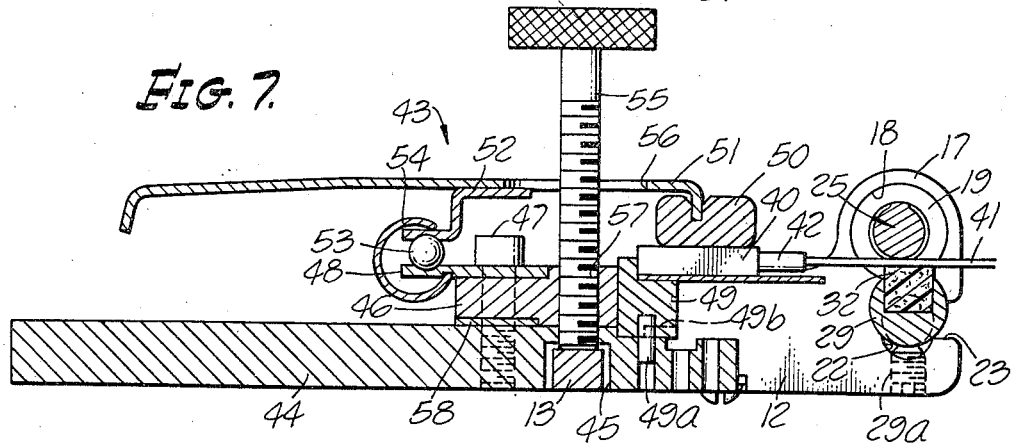
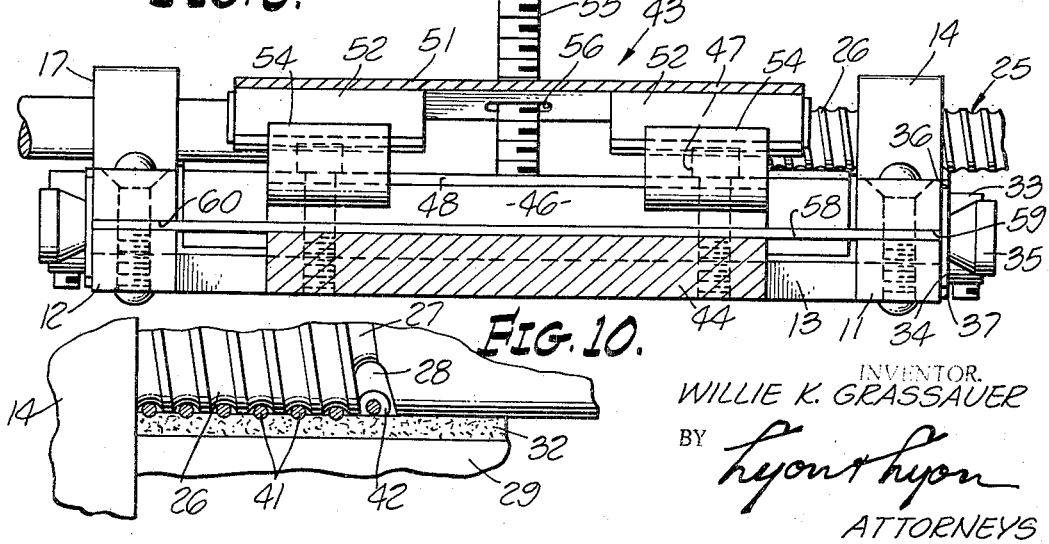

United States Patent Office 3,491,426
Patented Jan. 27, 1970

1

3,491,426
WIRE HOLDING FIXTURE
Willie K. Grassauer, Menlo Park, Calif., assignor to Raychem Corporation, Menlo Park, Calif., a corporation of California
Filed Apr. 5, 1968, Ser. No. 719,049
Int. Cl. H05k 13/04
U.S. Cl. 29—203                    12 Claims

ABSTRACT OF THE DISCLOSURE

A fixture which utilizes an advancing screw for permitting the sequential feeding of wires into a connector while securely clamping the previously inserted wires.

BACKGROUND OF THE INVENTION

It is often desirable to make multiple soldered connections to a connector having a plurality of closely spaced pins. One manner in which this is accomplished relatively quickly and cheaply and with a minimum of possibility of degradation of the soldered connections is by the use of a heat recoverable tubular member or sleeve having a solder insert positioned therein. These solder sleeves, when heated to above the heat recovery temperature of the sleeving material shrink down to firmly grasp the pin and the wire to be attached thereto. The heating also causes the solder insert to be melted to form a soldered connection between the pin and the conductor, the sleeving material controlling the flow of the solder and preventing it from being extruded from around the pin and thereby preventing shorting between the pins. Since the sleeve is fabricated of an insulating material, a complete solder and insulating connection is formed. The use of such solder sleeves has permitted a number of soldered connections to be made simultaneously as the various pins, sleeves and conductors can be positioned in the correct manner and then a single heating cycle used to shrink all of the sleeves and melt the soldered inserts contained therein. However, some difficulty has been encountered in positioning the various conductors, sleeves and pins and holding them in the proper orientation until the entire assembly is completed, and then during the heating cycle.

SUMMARY OF THE INVENTION

According to the present invention, a simple fixture is provided which permits a plurality of wires to be properly positioned relative to a connector having solder sleeves positioned on its terminal pins and held in position until the heating cycle is completed and the solder has resolidified. The apparatus also permits the quick and simultaneous release of the wires after the heating cycle is completed so that the entire connection process is quite rapid. The fixture includes an advancing screw having a feeding slot through which a wire can be passed. The connector is held in position adjacent the screw by means of a spring-biased clamp assembly. The wires are sequentially inserted through the feed slot of the screw into the solder sleeves, the screw being turned one revolution after each wire is inserted. The thread of the screw presses each preceding wire against a resilient pad mounted on a holding bar so that these wires are held in the proper position. After all of the wires have been inserted, the solder sleeves are recovered by a single heating cycle. The holding bar and screw can then be retracted and the connector removed. By the use of the fixture of the present invention, a plurality of soldered connections can be made simultaneously. The connector can be wired quickly and by a relatively unskilled operator so that the wiring cost is reduced.

As used herein, the term "connector" is not meant to be limited to any specific type of multiple pin connector or wire terminating device, but rather is used in a broader sense to include all electrical components having a plurality of pins to which different wires may be connected.

BRIEF DESCRIPTION OF THE DRAWINGS

FIGURE 1 is a perspective view of the fixture of the present invention;
FIGURE 2 is a perspective view of the wire locating and holding screw of the present invention;
FIGURE 3 is a detail view partly in section illustrating the manner in which the holding bar may be removed;
FIGURE 4 is a detail view, partly in section illustrating the manner in which the holding bar is moved away from the screw;
FIGURE 5 is a partial perspective view of the connector supporting member;
FIGURE 6 is a side elevation view of the fixture of the present invention;
FIGURE 7 is a cross-sectional view taken along lines 7—7 of FIGURE 1;
FIGURE 8 is a rear elevation view of the fixture of the present invention;
FIGURE 9 is a side elevation view illustrating the manner in which adjustment between the connector and the screw is achieved; and
FIGURE 10 is a partial front elevation of the fixture of the present invention.

DESCRIPTION OF THE INVENTION

Turning now to the drawings, the fixture of the present invention has a frame 10 having a pair of side members 11 and 12 and a connecting bar 13. The side member 11 is provided with a raised portion 14 provided with an aperture 15 for receiving a bearing 16. The side member 12 has a similar raised portion 17 having an aperture 18 aligned with the aperture 15 and receiving a bearing 19. The side member 11 is also provided with another aperture 20 spaced below the aperture 15. The aperture 20 has a generally oval shape and access to it is provided through a slot 21 in the forward end of the side member 11. Preferably, the height of the slot 21 is somewhat less than the smallest diameter of the aperture 20. The side member 12 is provided with a similar aperture 22 and slot 23, the aperture 22 being aligned with the aperture 20.

A screw 25 having thread 26 is positioned in the bearings 16 and 19 and its leading thread 27 is provided with a feeding slot 28. A holding bar 29 is provided with extensions 30 and 31 which are eccentrically positioned on the holding bar 29 and are positioned in the apertures 20 and 22. The extensions 30 and 31 are preferably squared off so that rotation of the holding bar 29 permits it to be removed from the frame 10 through the slots 21 and 23, as shown in FIGURE 3. The holding bar 29 is provided with a resilient pad 32 of urethane or the like which presses against the screw 25 when the holding bar 29 is in the position shown in the figures. The pressure between the pad 32 and screw 25 can be adjusted by means of set screws 29a.

The extension 30 of the holding bar 29 is securely attached to a nut 33 by a set screw or the like. The nut 33 is welded or otherwise attached to a strip 34 of spring steel or the like which extends back along the side member 11. The strip 34 is preferably provided with a knob 35 so that it can easily be grasped. The strip 34 is held in place by a pair of blocks 36 and 37 on the member 11. A similar strip is attached in the same manner to the extension 31 of the holding bar 29. By grasping the knobs on these strips and pulling them clear of the blocks 36, the strips can be rotated in the clockwise direction which, because of the eccentric mounting of the holding bar 29 on the extensions 30 and 31 causes the pad 32 to move away from the screw 25, as shown in FIGURE 4.

The connector 40 to the pins of which individual wires 41 are to be connected by means of solder sleeves 42 is held in a clamp assembly 43. The clamp assembly 43 comprises a block 44 having a passageway 45 through which the bar 13 passes. A second block 46 is fastened to the block 44 by a plurality of screws 47 which also fasten a plate 48 to the block 46. Also attached to the block 46 by any suitable means is a work supporting member 49 having a shoulder for receiving the connector. Preferably, the member 49 is provided with pins 49a which seat in suitable holes in the block 44. If desired, the member 49 can be made so that it can be turned over to accommodate different size connectors. As shown in FIGURE 5, the member 49 may be provided with a recess 49b to permit its easy removal from the block 44.

The other half of the work holding means is a bar 50 mounted on a spring clamp 51. Attached to the underside of the spring clamp 51 is a bracket 52 which pivots around a plurality of ball bearings 53 mounted on the plate 48 and which is held in place and forced toward the block 46 and work supporting member 49 by a plurality of C-springs 54. An adjustment screw 55 passes through an aperture 56 in the spring clamp 51, through a threaded aperture 57 in the block 46 and terminates against the bar 13. This entire clamp assembly is mounted on the frame 10 by means of a torsion spring 58 which is attached to the block 46 by the screws 47 and which fits into slots 59 and 60 of the side members 11 and 12.

As can best be seen in FIGURE 9, the entire clamp assembly 43 can be moved relative to the screw 25 and holding bar 29 by movement of the adjustment screw 55. As the screw 55 is moved in the clockwise direction, it causes the block 46 to ride upwardly on the screw 55 away from the bar 13. As all of the rest of the members of the clamp assembly 43 are connected to the block 46, they also travel upwardly with the result that the vertical alignment between the work, that is, the connector 40 and the wires 41 being fed between the screw 25, and holding bar 29 can be adusted to meet the different requirements of digerent connectors; for example, some connectors have multiple rows of pins which must sequentially be aligned with the screw 25 and holding bar 29.

The operation of the fixture is as follows. The connector 40 is clamped in the clamp assembly 43 and the adjustment screw 55 turned to align a row of pins on the connector 40 with the upper surface of the pad 32 on the holding bar 29. The screw 25 is then inserted into the bearings 16 and 19 so that the feeding slot 28 is aligned with the first pin of the connector 40. A wire is now passed through the feeding slot 28 and into the solder sleeve 42 positioned over the first pin on the connector 40. The screw 25 is now rotated, for example, by means of a knob 60 mounted on a disc 61 affixed to the outer end of screw 25. As the screw begins to turn, the feeding slot 28 is moved away from the wire 41, the latter now being positioned in the leading thread 27. The screw 25 exerts a pressure against the pad 32 which is felt as torque in turning the hand wheel. The frictional engagement of the wire 41 with the pad 32 prevents the wire from moving with the result that the screw 25 advances. For this purpose it is necessary that the friction between the pad and the wire be greater than the friction between the screw and the wire. In order for the screw to advance linearly, the friction between the pad and the wire must be greater than the friction between the screw and the bearings.

After the screw has been rotated 360 degrees, the feeding slot 28 is in alignment with the second of the pins of the connector 40. A second wire can now be inserted and the process repeated over and over until each pin is provided with a wire. Of course, the lead of the thread of the screw 25 must be related to the spacing between the pins of the connector, the spacing either being equal to or a multiple of the screw lead. As shown in FIGURE 10, as each succeeding wire is inserted, the screw holds the preceding wires in place so that there is no danger of a poor connection being made. After all the wires are in place, the solder sleeves are installed by any suitable source of heat such as a hot air blower or an infrared heater with the result that they all simultaneously shrink and form a soldered connection. If desired, a flat piece of sheet metal may be placed below the row of pins to be terminated to serve as a guide or reflector for the heat source. After the solder has cooled, the frictional engagement of the pad 32 of the holding bar 29 can be released by rotating the holding bar in the manner previously set forth. The screw 25 can then be retracted and the connector 40 removed from the clamp assembly 43.

It is essential that the threads of the screw 25 have a radius that is as large as the radius of the largest wire to be held in place. The thread must also have a good surface finish in order not to damage the wire and keep friction to a minimum. The elasticity of the resilient pad makes it possible to clamp different wire sizes and also provides the friction necessary to effectively clamp the wire.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A fixture adapted for simultaneously holding a plurality of wires to be coupled to a connector comprising:
   a frame;
   means on said frame adapted to hold said connector;
   a screw mounted on said frame and spaced from said means, said screw having a plurality of threads, one of said threads having a slot formed therein for receiving one of said wires; and
   a holding bar positioned adjacent said screw, said holding bar having a resilient surface for cooperating with the threads of said screw for holding wires inserted therebetween.

2. The fixture of claim 1 wherein said holding bar is rotatably mounted in said frame so that it can be rotated away from said screw.

3. The fixture of claim 1 wherein bearings are provided in said frame, said screw being mounted in said bearings whereby advancement of said screw is dependent on engagement of said threads with a wire inserted between said screw and said resilient surface.

4. The fixture of claim 1 wherein the position of said means adapted to hold said connector is adjustable relative to said screw and said holding bar.

5. The fixture of claim 4 wherein said means adapted to hold said connector comprises a torsion spring mounted on said frame, block means mounted to said torsion spring to support said connector, clamp means for engaging said connector and spring means for urging said clamp means toward said block means.

6. A fixture adapted for simultaneously holding a connector having a plurality of pins and a plurality of wires to be coupled to said pins comprising:
   a frame having a pair of extending side members;
   a bearing mounted in each of said side members;
   a screw mounted in said bearings, said screw having a plurality of threads, one of said threads having a slot formed therein for receiving one of said wires; a holding bar rotatably mounted in said side members below said screw, said holding bar having a resilient pad mounted thereon and rotatable into engagement with said screw to cooperate with the threads thereof for holding wires inserted therebetween; clamping means adapted to hold said connector; and means for mounting said clamping means on said frame adjacent said screw and holding bar, said mounting means permitting adjustment of said clamping means relative to said screw and holding bar.

7. The fixture of claim 6 wherein said holding bar is eccentrically in said frame.

8. The fixture of claim 7 wherein strip members are attached to the ends of said holding bar and positioned next to said side members, movement of said strip members causing rotational movement of said holding bar.

9. The fixture of claim 6 wherein the lead of said screw is related to the spacing between the pins of a connector to be used with the fixture.

10. The fixture of claim 6 wherein said clamping means comprises a block having a shoulder adapted to receive said connector, a clamping plate overlying said block and spring means for urging said block and said plate together.

11. The fixture of claim 10 wherein said means for mounting said clamping means comprises a torsion spring fastened to said block and mounted in said side members of said frame.

12. The fixture of claim 11 wherein an adjustment screw is threaded through said block and engaged with said frame, movement of said adjustment screw causing vertical movement of said clamping means relative to said screw and holding bar.

References Cited

UNITED STATES PATENTS

| | | | |
|---|---|---|---|
| 2,958,126 | 11/1960 | Shaw et al. | 29—241 X |
| 3,267,556 | 8/1966 | Scharf | 29—203 |

THOMAS H. EAGER, Primary Examiner

U.S. Cl. X.R.

29—241; 228—6, 44